United States Patent [19]

Valentas et al.

[11] 4,156,486
[45] May 29, 1979

[54] APPARATUS AND METHOD FOR PROCESSING FOOD MATERIAL UTILIZING OUT-OF-PHASE FEEDING TO A TREATING CHAMBER

[75] Inventors: Kenneth J. Valentas, Golden Valley; Palmer K. Strommer, Osseo; Takuzo Tsuchiya, Minneapolis, all of Minn.

[73] Assignee: General Mills, Inc., Minneapolis, Minn.

[21] Appl. No.: 785,140

[22] Filed: Apr. 6, 1977

[51] Int. Cl.$^2$ .............................................. A23L 1/18
[52] U.S. Cl. ................................ 414/220; 99/323.9; 222/273; 222/274; 414/786; 414/298
[58] Field of Search ........................ 214/17 B, 17 CC; 99/323.4, 323.9; 222/273, 274, 139, 142, 368, 138, 140, 141; 302/49; 426/449

[56] References Cited

U.S. PATENT DOCUMENTS

| | | | |
|---|---|---|---|
| 1,721,635 | 7/1929 | Miles | 222/273 |
| 2,205,324 | 6/1940 | Venable | 222/142 |
| 2,475,381 | 7/1949 | Erickson | 222/273 X |
| 2,652,935 | 9/1953 | Messing | 214/17 CC |
| 3,206,254 | 9/1965 | Mylting | 214/17 CC X |
| 3,231,387 | 1/1966 | Tsuchiya et al. | 99/323.4 X |
| 4,046,066 | 9/1977 | Wood | 99/323.9 X |

Primary Examiner—Robert G. Sheridan
Attorney, Agent, or Firm—G. O. Enockson; L. M. Lillehaugen; S. R. Peterson

[57] ABSTRACT

The food material to be processed is alternately transferred from two sources to an elongated treating chamber. The apparatus for carrying out the method includes rotary valve means employing two pocket areas, each pocket area including a plurality of pockets with each pair of diametrically located pockets having an interconnecting passage. The pockets of one area are angularly displaced or out-of-phase with the pockets of the other area. Owing to the out-of-phase relationship, the food material to be processed is alternately received by one pocket of one area, then by the next pocket of the other area and so on through each revolution of the valve means in which the pockets are contained, the material being discharged in the same out-of-phase relationship through the interconnecting passages and diametrically disposed pockets into the inlet of a pressurized elongated treating chamber.

18 Claims, 10 Drawing Figures

APPARATUS AND METHOD FOR PROCESSING FOOD MATERIAL UTILIZING OUT-OF-PHASE FEEDING TO A TREATING CHAMBER

BACKGROUND OF THE INVENTION

1. Field of the Invention

The present invention relates generally to the treating or processing of food materials under heat and pressure, and pertains more particularly to apparatus utilizing a dual valve arrangement which enables the capacity of a single elongated treating chamber to be substantially increased.

2. Description of the Prior Art

The use of rotary valve devices for introducing food material into an elongated treating chamber that is under pressure is not new. For instance, a rotary valve device is depicted in U.S. Pat. No. 3,231,387, granted on Jan. 25, 1966 to Takuzo Tsuchiya et al for "Method and Apparatus for Continuous Puffing". In another patent, U.S. Pat. No. 3,754,926, granted on Aug. 28, 1973 to Palmer K. Strommer et al for "Method for Texturizing Protein Material", it is stated that the valve member of the rotary valve device there described may be rotated at any desired speed depending upon such things as the size of the pockets, the number of pockets and the feed rate of protein material.

However, there are various practical limitations imposed upon the size and number of pockets employed in a valve member of the type alluded to. To increase the physical size of the various pockets, for example, necessitates an increase in the size or diameter of the valve member. This is not too feasible because of the more aggravated sealing problems resulting from an increased size. It will be recognized that it is necessary to seal any rotatable valve member of the character referred to from excessive steam leakage and effective sealing simply becomes more difficult as the rotor or valve diameter increases.

As far as increasing the number of pockets, for a given diameter of valve member any significant increase in the number of pockets results in the wall thickness of the pockets becoming dangerously thin.

Increasing the rate of rotation of the valve member also presents problems, for it is important to have each pocket filled with material, and if the speed is too great for a given size pocket, the pockets simply will not receive the full quantity of material for which they have been designed to accommodate.

While the two above-identified patents indicate various food materials that can be processed with the methods embodied therein, it will be well to mention U.S. Pat. No. 3,955,486, granted to Palmer K. Strommer on May 11, 1976 for "Food Processing Apparatus". The apparatus there depicted utilizes eight pockets and it is pointed out that the arrangement provides a continuous stream of steam through the apparatus; the provision of a continuous stream of steam furnishes a reaction environment for the food material by reason of the continued maintenance of an elevated pressure within the treating chamber. To achieve this goal, eight pockets, as mentioned above, were employed. However, for various reasons a total of six pockets is the preferred number and this number is indicative of the trend in actual practice.

THE PRESENT INVENTION

The invention herein described is concerned with the economies of treating food materials, such as those described in the several patents hereinbefore mentioned. More specifically, an object of the present invention is to increase the capacity of an elongated treating chamber for very little additional cost. In this regard, it is planned that the rotary valve device, which successively delivers food material to the elongated treating chamber, be replaced or modified so that one set of pockets will successively deliver quantities of materials as in the past but in which a second set of pockets will alternately deliver additional quantities of material to the same elongated treating chamber to which the first set delivers. The second set of pockets is out-of-synchronism or out-of-phase with the first set so that each pocket of the second set is delivering material to the elongated treating chamber at a time when a pocket of the first set is not delivering material.

It is also an object of the invention to provide apparatus that will enable a substantial saving in thermal energy used in processing the food material, for the steam consumption per pound of food product will be appreciably reduced for a given design when utilizing the teachings of our invention.

Consequently, a dual aim of the present invention is to increase the capacity of existing equipment with very little expense for additional or modified equipment, and concomitantly produce more food product for less than a proportionate increase in energy consumption.

Yet another object is to provide apparatus in accordance with the foregoing objects that can be used with elongated treating chambers already in use.

Briefly, our invention envisages the employment of a single elongated treating chamber into which are alternately delivered predetermined quantities of the food material to be processed, the food material being obtained from two sources. Because of the out-of-phase feeding, more food can be processed with an elongated chamber of a given design and size than heretofore.

BRIEF DESCRIPTION OF THE DRAWINGS

FIG. 6 is a longitudinal view corresponding to FIG. 2 but depicting a modified treating chamber that can be used in lieu of the one shown in FIG. 1;

FIG. 9 is a top plan view representing the two pocket areas formed on the single rotor (also representative of the two rotor arrangement), and FIG. 10 is a developed or flat view of the rotor showing the two pocket areas (which would be the same for two rotors as well) with various time intervals superimposed thereon to facilitate an understanding of the out-of-phase relationship existing between the pockets of the two areas (whether on the single rotor or on separate rotors).

DESCRIPTION OF THE PREFERRED EMBODIMENTS

Figure 3:
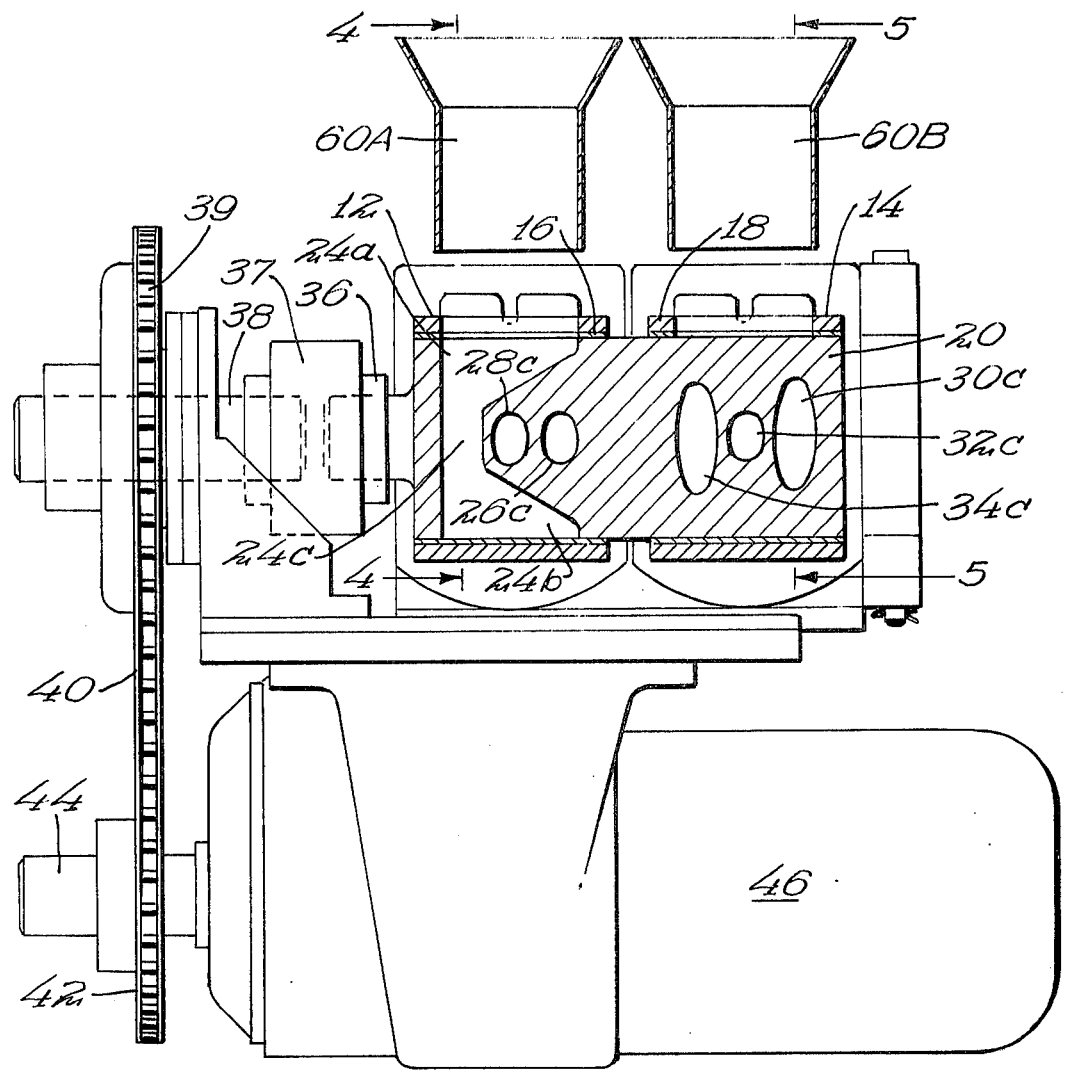
FIG. 3 is an elevational view, largely in section, taken in the direction of line 3—3 of FIG. 1 for the purpose of showing the single rotor used to exemplify the invention.
Figures 4, 5:
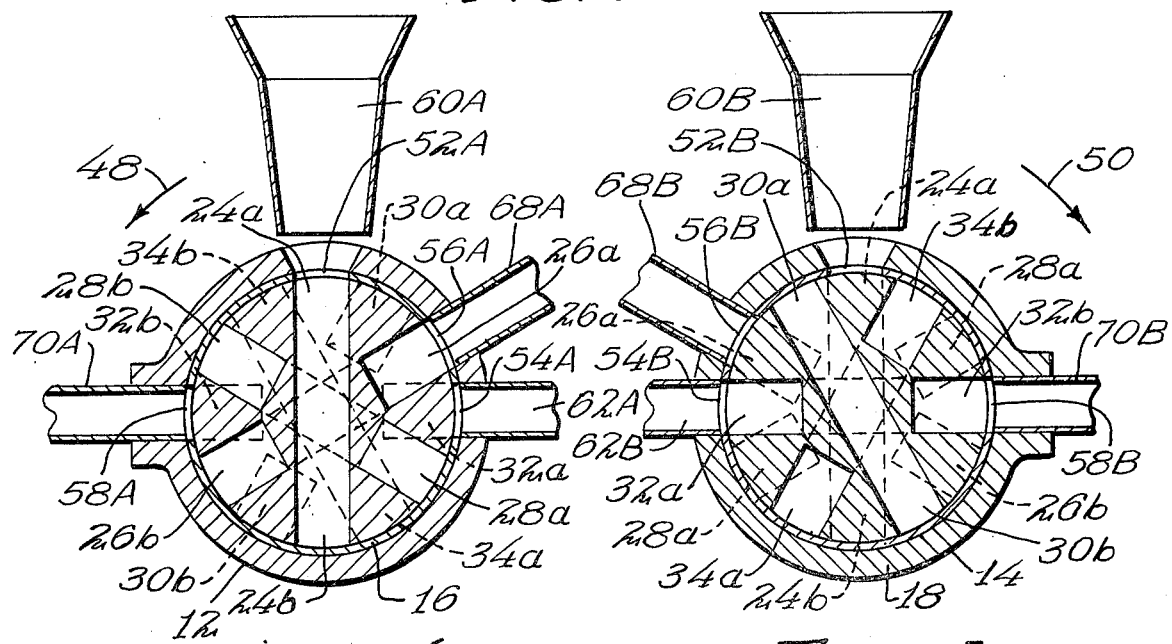
FIG. 4 is a sectional view taken in the direction of line 4—4 of FIG. 3, the pockets of the area in the plane of the section being shown in solid outline and the pockets of the second being shown in phantom outline so as to denote the out-of-phase relationship of the second pockets with respect to the first pockets.
FIG. 5 is a sectional view resembling FIG. 4 but taken in an opposite direction through the second pocket area as indicated by the line 5—5 in FIG. 3.

Processing apparatus illustrating one embodiment of the invention has been denoted generallly by the reference numeral 10. From FIGS. 1 and 3 it will be discerned that the apparatus 10 includes two housings 12 and 14. As can be seen in FIGS. 3 and 4, the housing 12 contains therein a liner of bearing member 16, whereas, as can be seen in FIGS. 3 and 5, the housing 14 contains an identical liner or bearing member 18.

The liners or bearing members 16, 18 rotatably receive therein a single valve member or rotor 20 having two longitudinally spaced pocket areas 22A and 22B. The pocket areas 22A resides within the liner or bearing member 16, whereas the pocket area 22B resides in the liner or bearing member 18.

The pocket area 22A is provided with six pockets 24a, 24b, 26a, 26b, 28a and 28b, those pockets having the suffix "b" being located diametrically with respect to those pockets having the suffix "a". The pockets 24a and 24b are interconnected by a passage 24c; the pockets 26a and 26b are interconnected by a passage 26c, and the pockets 28a and 28b are interconnected by a passage 28c.

The pocket area 22B contains pockets 30a, 30b, 32a, 32b, 34a and 34b. As with the various pockets contained in the area 22A, the pockets contained in the area 22B have interconnecting passages 30c, 32c and 34c.

As can best be understood from FIGS. 4, 5 and 10, the pockets 30a-34b are angularly displaced from the pockets 24a-28b, respectively. More specifically, since there are six pockets contained in the area 22A and six pockets contained in the area 22B, each pocket 24a-34b resides within an arc subtending a 30° angle. Stated somewhat differently there are twelve pockets 24a-34b and owing to the out-of-phase relationship each is displaced from the other by an angle of 30°. The reason for the angular displacement or out-of-phase relationship will be better understood as the description progresses.

Describing now the manner in which the single valve member or rotor 20 is rotated, it will be observed that a shaft 36 extends from one end of the member 20. A coupling 37 mechanically connects the shaft 36 to a shaft 38 having a sprocket 39 thereon. Entrained about the sprocket 39 is a drive chain 40, the drive chain 40 also passing about a sprocket 42 on a drive shaft 44 extending from an electric motor 46. To avoid confusion between FIGS. 4 and 5, a directional arrow 48 has been applied to FIG. 4 and a directional arrow 50 to FIG. 5. In other words, when the rotor 20 is viewed from one end it would be seen as rotating counterclockwise, whereas when viewed from the opposite end it would be seen as rotating clockwise. It always rotates in the same direction, however, being driven by the electric motor 46 through the components 36-44.

The liner or bearing member 16 extends virtually around the entire interior of the housing 12 with the exception of ports or openings at 52A, 54A, 56A and 58A. Similarly, the other liner or bearing 18 substantially encircles the interior of the housing 14 with the exception of ports or openings at 52B, 54B, 56B and 58B. As the description proceeds, it will be seen that the openings 52A and 52B, 54A and 54B, 56A and 56B, and 58A and 58B constitute angularly oriented stations at which quantities of food material are received and discharged and at which steam is introduced and exhausted.

Figure 2:
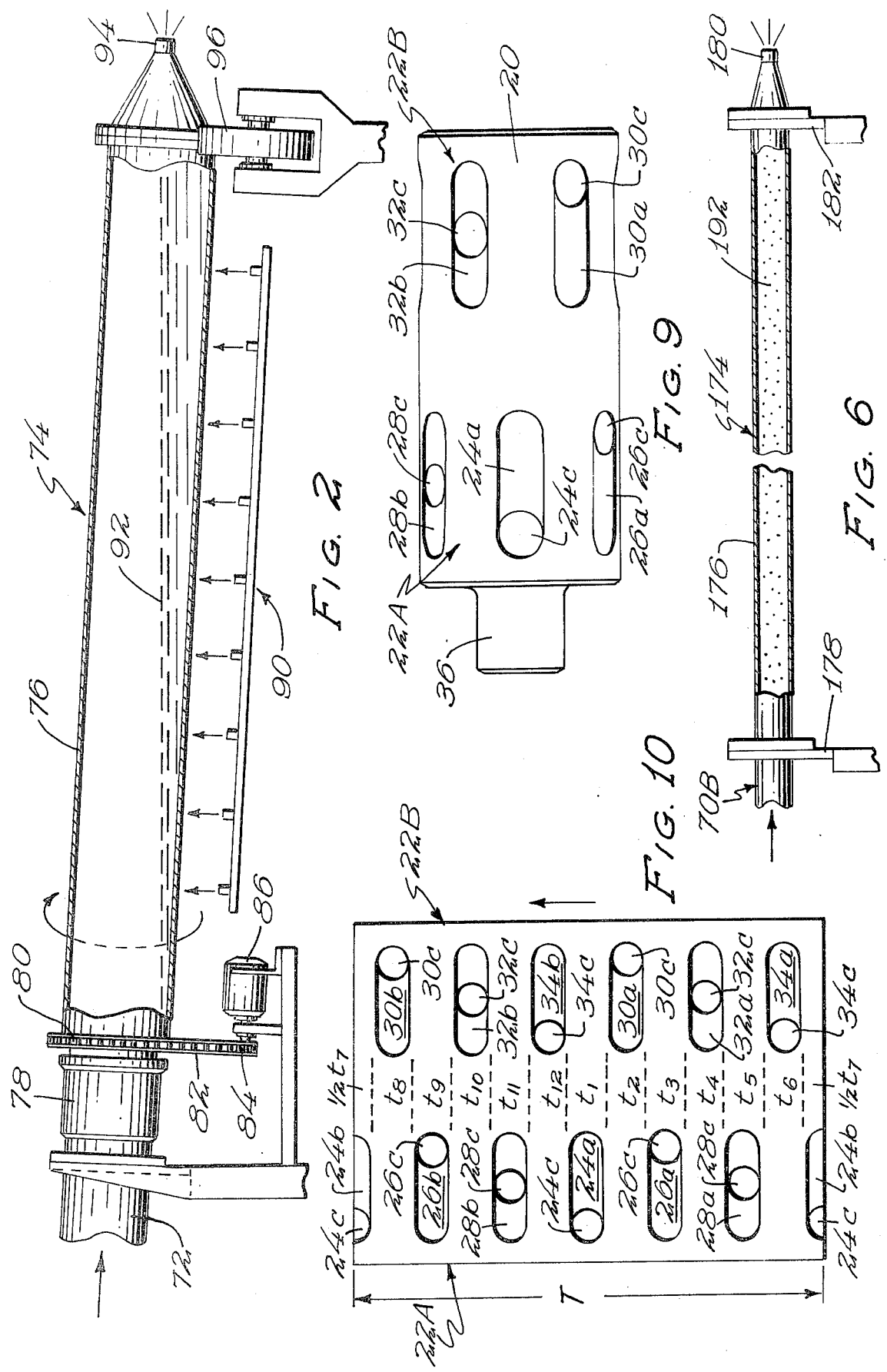
FIG. 2 is a longitudinal view of the elongated treating chamber appearing in FIG. 1, the view being taken in the direction of line 2—2 in FIG. 1 and a longitudinal portion having been broken away in order to illustrate to better advantage the movement of the food material therethrough.

More specifically, the openings 52A and 52B constitute stations at which the food material to be processed is delivered to the apparatus 10. Actually, specific quantities of food material are determined or measured by the size of the pockets contained in the two pocket areas 22A, 22B. Simple hoppers 60A and 60B, as can be seen in FIGS. 2-4 are superimposed above the material-receiving stations 52A and 52B, respectively, and gravitationally deliver the material to the pocket areas 22A, 22B as they rotate into position therebeneath.

The openings 54A and 54B constitute steam-admitting stations. A pair of steam inlet pipes 62A, 62B are connected to the housings 12 and 14, respectively, at 54A and 54B, respectively. From FIG. 1, it can be appreciated that the inlet pipes 62A and 62B are branches stemming from a main conduit 64 which is connected directly to a boiler or steam source 66.

Although most of the steam will pass through the valve member or rotor 20, any steam remaining within the confines of the rotor 20 is removed or exhausted through pipes 68A and 68B which are in communication with the openings 56A and 56B, respectively. More specifically, any residual steam pressure in the valve member 20 is depressurized prior to feeding food material through the valve member 20 through the openings 52A and 52B.

The remaining openings 58A and 58B, these constituting discharge stations for the material, are connected to discharge or exit pipes 70A and 70B, respectively.

The discharge or exit pipes 70A, 70B constitute branches that feed into a main conduit 72. The conduit 72 connects with the inlet end of an elongated treating chamber 74 shown in FIGS. 1 and 2 in the form of a rotatable cylindrical barrel 76. Although more fully described in the hereinbefore mentioned U.S. Pat. No. 3,231,387, it can be explained that the elongated chamber includes a combined rotary bearing and joint 78. The barrel 76 has a sprocket 80 about which is entrained a chain 82. A sprocket 84 is driven by means of an electric motor 86. In this way the barrel 76 is rotated about its longitudinal axis.

As can be seen in FIG. 2 the longitudinal axis about which the barrel 76 rotates is inclined slightly. In actual practice the angle of inclination is adjustable. Beneath the inclined barrel 76 is a set of burners denoted generally by the reference numeral 90 which supplies heat to the bed of food material 92 as it progresses therethrough. Supporting the barrel 76 for rotation adjacent its discharge nozzle 94 are a pair of rollers 96.

One advantage of our apparatus is that it can be utilized in combination with various elongated treating chambers. It will be recognized that where the treating chamber is constructed of highly sophisticated components that are quite expensive, then the saving in equipment, when practicing our invention, is even more pronounced than when simpler treating chambers are employed. In other words, it is within the purview of the present invention to alternately feed food material from two different pocket areas or pocket sections into a single treating chamber irrespective of the complexity of the chamber.

To demonstrate the versatility of our invention as far as different treating chambers are concerned the chamber 174 has been shown in FIG. 6. It includes a tube 176, which unlike the barrel 76, does not rotate. Instead, it is fixedly supported adjacent its inlet end by a standard 178 and adjacent its discharge nozzle 180 by a standard 182. Whereas with the elongated treating chamber 74, the food particles constituting the bed 92 are gravity transported, in the chamber 174, the particles 192 are fluid transported. The elongated chamber 174 is more fully described in U.S. Pat. No. 3,754,926 which has already been mentioned.

Although the angular displacement of the pockets contained in area 22B of the apparatus 10 with respect to the pockets contained in area 22A can be readily understood from FIGS. 4 and 5, it is believed that FIG. 10 will further help in assuring a complete understanding of the situation and the benefits to be gained. Inasmuch as the rotor 20 will be rotated at a constant speed by the motor 46 and since the various pockets 24a–34b are contained within peripheral of circumferential arcs of 30° each, the various time intervals during which the various pockets 24a–34b are passing by a station can be graphically represented. In this regard, it will be assumed that the pocket 24a of the pocket area 22A is directly beneath the hopper 60A and therefore falls within the interval of time labeled $t_1$. This is the material-receiving position of the pocket 24a. This position appears in FIG. 3, it might be mentioned. However, as can be perceived from FIG. 4, the pocket 30a has not yet arrived at its feed-receiving station, which would be directly beneath the hopper 60B.

Consequently, it follows that the arrival of the pocket 30a will be during an interval $t_2$ which is immediately after the elapse of the time constituting the interval $t_1$. However, after the pocket 30a has moved into juxtaposition with the opening 52B, then the next pocket 26a will move into position beneath the material-receiving openings 52A. Hence, the pocket 26a will not reach its material-receiving position until the time interval $t_3$. After the pocket 26a receives this material, then the pocket 32a moves into position beneath the hopper 60B to be filled.

Consequently, it should be evident that there is a repeated switching back and forth between the various pockets 24a–28b contained in the area 22A and the pockets 30a–34b contained in the area 22B. However, during each complete revolution of the valve member or rotor 20, that is, the total period of time T ($T=t_1+t_2+t_3+t_4+t_5+t_6+t_7+t_8+t_9+t_{10}+t_{11}+t_{12}$) each pocket 24a–34b will have moved into the food material-receiving position 52A or 52B, as the case may be, and will have received material to be conveyed to the discharge station 58A associated with the area 22A or the discharge station 58B associated with the area 22B, these discharge stations 58A, 58B having the pipes 70A, 70B connected thereto.

Considering the particular pocket 24a, it will be appreciated that once it has received its food material when at the twelve o'clock position in FIG. 3, it moves in a counterclockwise direction to the nine o'clock position at which point it is in registry with the pipe 70A. Since the pocket 24a is diametrically located with respect to the pocket 24b, it will be appreciated that the pocket 24b is automatically moved into registry with the steam inlet station 54A, receiving steam from the boiler or steam source 66 via the pipe 62A.

It follows from the foregoing that steam under pressure is supplied to the pocket 24b and also through the passage 24c leading to the pocket 24a. The pressure exerted through the pipe 62A should be sufficient so that the food material is rapidly forced through the pipe 70A into the rotatable barrel 76 of the chamber 74 and subsequently through the discharge nozzle 94. The fluid, it will be understood, supplied from the source 66, while referred to as steam, may be a fluid with a high heat transfer coefficient, such as a mixture of steam and air or a mixture of other gaseous fluids. The relatively heavy food material 92, usually cereal, is processed by the time (45 to 60 seconds) it leaves the nozzle 94, all as more fully explained in previously alluded to U.S. Pat. No. 3,231,387. In contradistinction, the lighter food material 192, usually flour, traverses the tube 176 of the chamber 174 in about 0.2 second.

Since the rotor 20 is rotating in a counterclockwise direction as viewed in FIG. 4, it will be understood that the particular pocket 24a will move from the discharge station, that is the nine o'clock position downwardly to the six o'clock position. As the pocket 24a is traversing this arcuate path, the pocket 24b is moving upwardly into alignment with the port or opening 56A and the exhaust pipe 68A at which station any steam under pressure remaining in the pockets 24a, 24b and passage 24c is relieved. When the pocket 24b reaches the twelve o'clock position, it is in position to receive material just as the pocket 24a received material when it was in a twelve o'clock position.

While the foregoing traces what happens during a complete revolution (or period of time T) of the valve member or rotor 20, it should now be appreciated that once the pocket 24a has received its food material from the hopper 60A, this being during the period $t_1$, the approaching pocket 30a is not yet in position beneath the hopper 60B to receive material. However, as the rotor 20 continues to rotate, the succeeding time interval $t_2$ occurs and it is at this moment that the pocket 30a is directly beneath the hopper 60B so as to be filled through the opening 52B in the liner or bearing 18.

After being filled at the twelve o'clock position or station the pocket 30a rotatively advances to its discharge station at 54B and is then forced directly into the pipe 68B. At this time, the pocket 30b, which is diametrically opposite the pocket 30a, is at the station 54B where it receives steam, that is, in alignment with the inlet steam pipe 62B. Consequently, the material that has been transferred or conveyed from the material-receiving station 52B to the discharge station 58B is actually discharged into the pipe 70B, then into the conduit 72 which leads directly into the pressure tank 74.

After discharging the material at the discharge station represented by the opening 58B, the pocket 30a continues to rotate downwardly, whereas its counterpart 30b rotates upwardly into juxtaposition with the opening 56B which is connected to the pipe 68B.

Immediately after the pocket 30a has left the material-receiving station at the top, the next pocket 26a moves into a corresponding position for receiving material through the opening 52A. This is during the time interval t₃. The pocket 26a then rotatively advances in the same fashion that the pocket 24a progressed. During the time interval t₄, the pocket 32a is at the material-receiving station 52B.

The advancement of the various pockets continues through a complete revolution or time T of the rotor 20, the material first being received from the hopper 60A by one pocket in the pocket area 22A and then by a pocket in the other pocket area 22B.

Figure 7:
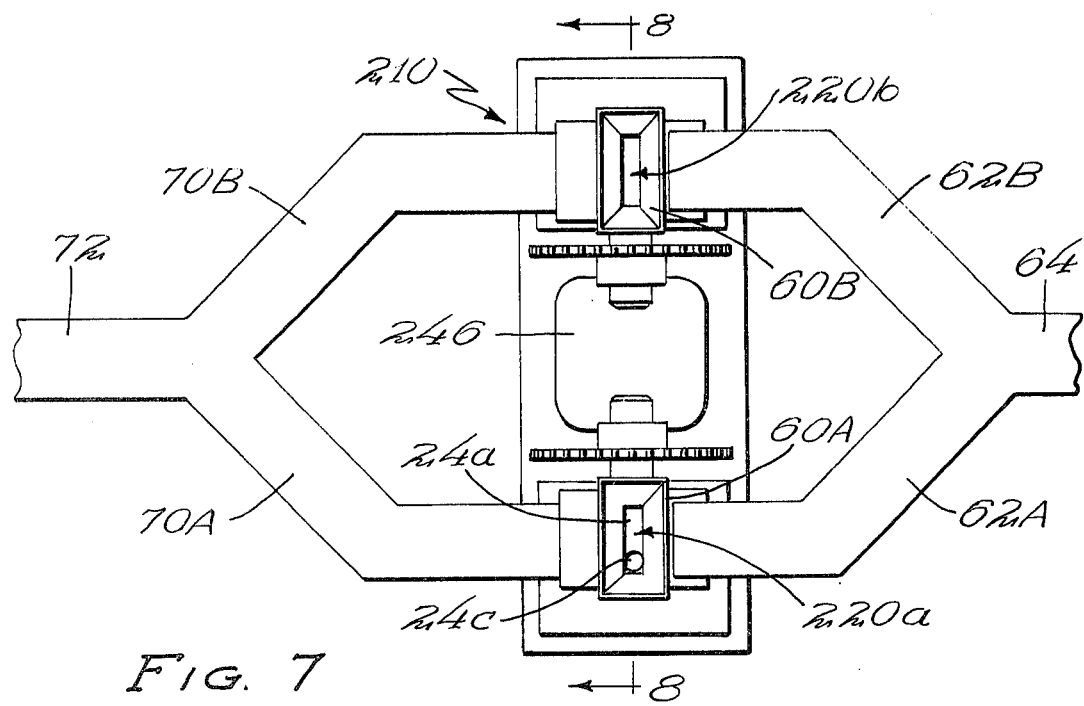
FIG. 7 is a top plan view, although of smaller scale than FIG. 1, of a two rotor embodiment our invention may assume.
Figure 8:
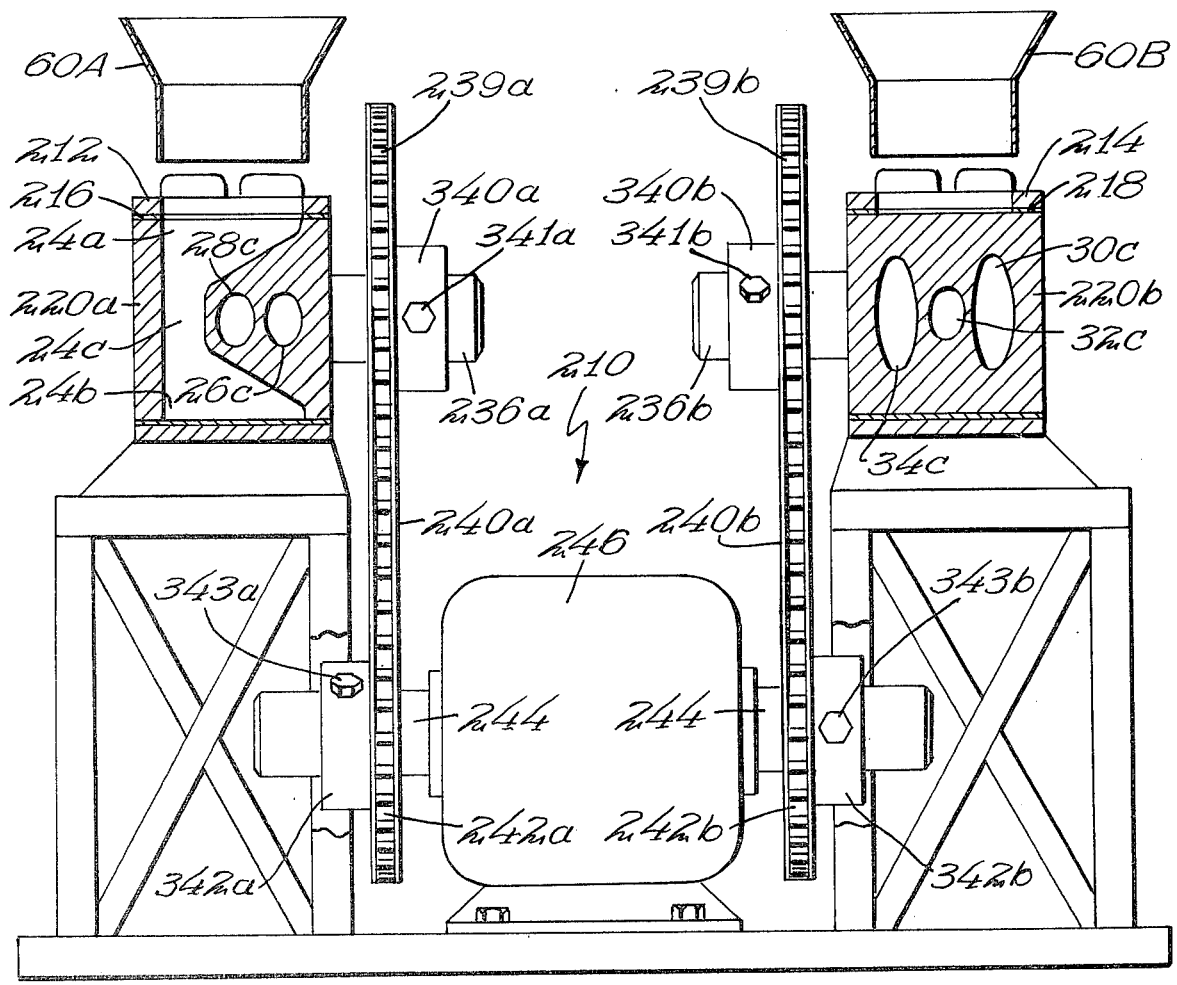
FIG. 8 is an elevational view, largely in section, taken in the direction of line 8—8 of FIG. 7 for the purpose of better showing the two rotors.

Having presented the foregoing description of the apparatus 10, the apparatus 210 appearing in FIGS. 7 and 8 should be easily understood. In this embodiment, the apparatus 210 includes two housings 212 and 214 corresponding to the housings 12 and 14 in the apparatus 10. The housing 212 contains a liner or bearing member 216, and the housing 212 has a bearing member 218.

The liners or bearing members 212 and 214 rotatably receive therein separate valve members or rotors 220a and 220b, the valve member 220a having a pocket area 22A and the member 220b a pocket area 22B. The pocket area 22A resides within the liner or bearing member 216, whereas the pocket area 22B resides in the liner or bearing member 18.

Inasmuch as in this embodiment two rotors 220a, 220b are employed, the out-of-phase relationship is maintained through the agency of a drive mechanism which comprises a shaft 236a for the valve member or rotor 220a, and a shaft 236b for the rotor 220b, the shaft 236a having a sprocket 239a thereon and the shaft 236b a sprocket 239b thereon. Entrained about the sprocket 239a is a drive chain 240a, and entrained about the sprocket 239b is a drive chain 240b. The drive chain 240a passes about a sprocket 242a on one end of the drive shaft 244 extending from one end of an electric motor 246. The drive chain 240b passes about a sprocket 242b on the other end of the drive shaft 244.

It will be observed that the sprocket 239a has a hub or collar 340a and the sprocket 239b has a hub or collar 340b. The hubs 340a, 340b each have a set screw 341a, 341b so that the sprockets 239a, 239b can be oriented at displaced angles on their respective shafts 236a and 236b.

Similarly, the sprocket 242a has a hub or collar 342a and the sprocket 242b a hub or collar 342b, each having a set screw 343a, 343b, respectively so that the sprockets 242a, 242b can be oriented at displaced angles on the motor shaft 244. In practice, rather than using set screws the hubs and shafts would be splined or keyed to provide the displaced angular relationship. Of course, rendering the sprocket 239a angularly adjustable with respect to the sprocket 239b or the sprocket 242a angularly adjustable with respect to the sprocket 242b will suffice. It is not essential that all four sprockets be angularly adjustable, as the adjustability of either pair 239a, 239b or 242a, 242b will be enough to angularly displace the rotor 220b from the rotor 220a, more specifically an angle of 30° to provide the specific out-of-phase relationship between the pocket areas 22A and 22B; the same reference characters have been retained for those pocket areas as the areas used in the earlier-described embodiment labeled 10. In actual practice, a gear train has been employed to maintain a fixed out-of-phase relationship between two rotors corresponding to the rotors 220a, 220b.

The hoppers 60A and 60B in FIGS. 7 and 8 are the same as in FIGS. 1, 3, 4 and 5.

Figure 1:
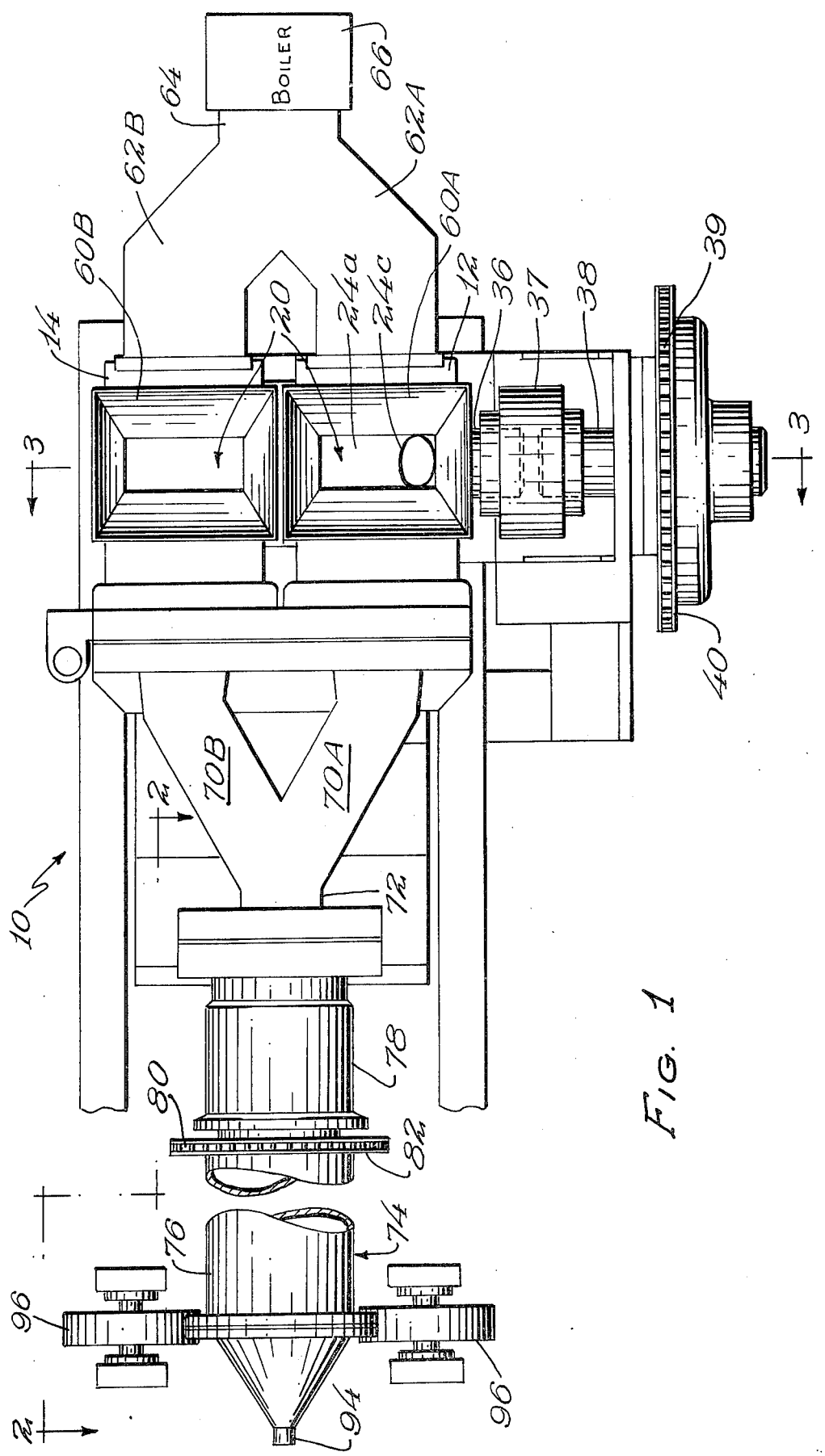
FIG. 1 is a top plan view of apparatus exemplifying our invention, a longitudinal portion of the single elongated treating chamber having been removed to permit a larger scale to be employed.

From the foregoing, it should be understood that substantially twice the quantity of food material can be processed when using the elongated treating chamber 74 shown in FIGS. 1 and 2 in one instance and the chamber 174 shown in FIG. 6 in the other instance, as contrasted with a single six-pocket rotor or valve member. Of course, rotors having various numbers of pockets have been used in the past. However, it is within the contemplation of our invention to generally double the effectiveness of whatever number has been used. The capacity of a single elongated treating chamber, such as the chamber 74 or 174, is not precisely doubled; however, it is almost doubled. Specific tests have shown that the capacity has been increased from 35 pounds/minute to approximately 70 pounds/minute by using a two-ganged, six-pocket valve member, that is, two out-of-phase rotors 220, 220b with one such rotor providing an area 22A and the other rotor providing the other area 22B.

Whereas the saving in equipment costs alone would justify the use of our invention, it should be recognized that a further saving is automatically effected, for the steam consumption, while increased, is in no way doubled even though the capacity is virtually doubled. Consequently, the steam comsumption per pound of food product produced is substantially decreased, in the installation herein referred to, from approximately 0.565 pound of steam per pound of food product to approximately 0.413 pound of steam per pound of food product.

It is important, therefore, to appreciate that two distinct economies can be realized with our invention: (1) increase in processing capacity, and (2) decrease in processing energy per pound of material treated.

We claim:

1. Apparatus for processing food material comprising an elongated treating chamber, first means providing a source of food material, second means providing a source of food material, and continuously rotating means having out-of-phase pockets for alternately transferring food material only from said first means and then only from said second means to said elongated chamber during successive substantially equal intervals of time so that food material from said second means is not delivered to said elongated chamber when food material from said first means is being delivered to said elongated chamber and so that food material from said first means is not delivered to said elongated chamber when food material from said second means is being delivered to said elongated chamber, the periods of time between said substantially equal intervals of time being substantially equal to each other and considerably less than said substantially equal intervals of time.

2. Apparatus for processing food material comprising an elongated treating chamber, first rotative means for successively delivering during one revolution of said first rotative means individual quantities of food material during substantially equal portions of time to the inlet of said chamber for processing therein, and second rotative means for successively delivering during one revolution of said second rotative means quantities of food material during substantially equal periods of time which also substantially equal said first-mentioned periods of time to the inlet of said chamber, means for rotating both of said first and second rotative means at substantially the same rate of rotation, said second means delivering its successive quantities of food material to said elongated chamber during intervals of time when said first means is not delivering its successive quantities to said elongated chamber, said substantially equal periods of time being determined by said rotation rate and being appreciably greater than the intervals of time therebetween.

3. Apparatus for processing food material comprising an elongated treating chamber, first means for successively delivering individual quantities of food material during substantially equal periods of time to the inlet of said chamber for processing therein, said first means including a plurality of angularly spaced pockets, and second means for successively delivering quantities of food material during substantially equal periods of time which also substantially equal said first-mentioned periods of time to the inlet of said chamber, said second means including a second plurality of angularly spaced pockets, said second pockets being angularly and fixedly displaced by at least an angle equal to the angle subtended by each of said first pockets and said second means delivering its successive quantities of food material to said elongated chamber during intervals of time when said first means is not delivering its successive quantities to said elongated chamber.

4. The apparatus of claim 3 including a pair of rotors, said first means being located on one of said rotors and said second means being located on the other of said rotors.

5. Apparatus for processing food material comprising first rotary means for receiving a first quantity of food material during one interval of time at a first station and transferring said first quantity of material to a second station angularly displaced from said first station for removal during a second interval of time subsequent to said first interval of time, second rotary means for receiving a second quantity of material during a third interval of time at a third station and transferring said second quantity of material to a fourth station angularly displaced from said third station for removal during a fourth interval of time, said third interval of time occurring between said first and second intervals of time, means for constantly rotating said first and second rotary means in the same rotative direction, means for supplying a gaseous medium to said first and second rotary means to effect removal of at least the major portion of said each of said quantities of material at said second and fourth stations, and means connected to said first and second rotary means for conveying said first and second quantities of material to said elongated chamber.

6. The apparatus of claim 5 in which said first and second rotary means are separate rotatable units, and means for rotating said units in an angularly and fixedly displaced and out-of-phase relationship.

7. Apparatus for processing food material comprising first and second housings, valve means rotatable within said housings, said valve means including first and second longitudinally spaced pocket areas, each pocket area including a plurality of angularly spaced pockets, the pockets of one area being angularly and constantly displaced with respect to the pockets of the other area by at least a fixed angle corresponding to the angle subtended by the pockets of said other area, an elongated treating chamber, means providing communication from said first housing to said elongated treating chamber, and second means providing communication from said second housing to said elongated treating chamber, whereby said treating chamber alternately receives food material from said first housing and then from said second housing throughout each revolution of said valve means.

8. The apparatus of claim 7 in which said valve means includes a pair of rotors.

9. The apparatus of claim 7 in which each of said pockets is the same size so that equal quantities of food material are transferred to said elongated chamber during each revolution of said valve means.

10. Apparatus for processing food material comprising rotary valve means providing two cylindrical pocket areas, each pocket area including a plurality of pairs of diametrically located pockets each having an interconnecting passage extending therebetween, the pairs of pockets of said pocket areas having corresponding angles therebetween and the angles between the pairs of pockets of said areas being at all times one-half that of said corresponding angles so that the pairs of pockets of one of said areas are always completely out-of-phase with the pairs of pockets of the other of said areas, means for feeding the food material to be processed into said pockets at a first angular location, means for supplying a gaseous medium to said pockets at a second angular location, a single elongated treating chamber, and means at a third angular location diametrically opposite said second angular location for conveying food alternately discharged from said pockets at said third angular location to said single elongated chamber.

11. Apparatus for processing food material comprising an elongated treating chamber, a single rotor, first means located near one end of said rotor for successively delivering individual quantities of food material to the inlet of said chamber for processing therein, said first means including a plurality of angularly spaced pockets, second means located near the other end of said rotor for successively delivering quantities of food material to the inlet of said chamber, said second means including a second plurality if angularly spaced pockets, said second pocket being angularly displaced by at least an angle equal to the angle subtended by each of said first pockets, said second means delivering its successive quantities of food material to said elongated chamber during intervals of time when said first means is not delivering its successive quantities to said elongated chamber.

12. Apparatus for processing food material comprising first rotary means for receiving a first quantity of food material during one interval of time at a first station and transferring said first quantity of material to a second station angularly displaced from said first station for removal during a second interval of time subsequent to said first interval of time, second rotary means for receiving a second quantity of material during a third interval of time at a third station and transferring said second quantity of material to a fourth station angularly displaced from said third station for removal during a fourth interval of time, said third interval of time occurring between said first and second intervals of time, said first and second rotary means constituting a single rotatable unit, means for supplying a gaseous medium to said first and second rotary means to effect removal of at least the major portion of said each of said quantities of material at said second and fourth stations, and means connected to said first and second rotary means for conveying said first and second quantities of material to said elongated chamber.

13. Apparatus for processing food material comprising first and second housings, valve means including a single rotor rotatable within said housings, said valve means including first and second longitudinally spaced pocket areas, each pocket area including a plurality of angularly spaced pockets, the pockets of one area being angularly displaced with respect to the pockets of the other areas by at least an angle corresponding to the angle subtended by the pockets of said other area, an elongated treating chamber, means providing communication from said first housing to said elongated treating chamber, and second means providing communication from said second housing to said elongated treating chamber, whereby said treating chamber alternately receives food material from said first housing and then from said second housing throughout each revolution of said valve means.

14. Apparatus for processing food material comprising rotary valve means providing two cylindrical pocket areas, each pocket area including a plurality of pairs of diametrically located pockets each having a interconnecting passage extending therebetween, the pairs of pockets of said pocket areas having corresponding angles therebetween and the angles between the pairs of pockets of said areas being one-half that of said corresponding angles so that the pairs of pockets of one of said areas are completely out-of-phase with the pairs of pockets of the other of said areas, means for feeding the food material to be processed into said pockets at a first angular location, means for supplying a gaseous medium to said pockets at a second angular location, a single elongated treating chamber, and means at a third angular location diametrically opposite said second angular location for conveying food alternately discharged from said pockets at said third angular location to said single elongated chamber, said rotary valve means including a single valve member and said pocket areas being longitudinally spaced on said single valve member.

15. Apparatus for processing food material comprising rotary valve means providing two cylindrical pocket areas, each pocket area including a plurality of pairs of diametrically located pockets each having an interconnecting passage extending therebetween, the pairs of pockets of said pocket areas having corresponding angles therebetween and the angles between the pairs of pockets of said areas being one-half that of said corresponding angles so that the pairs of pockets of one of said areas are completely out-of-phase with the pairs of pockets of the other of said areas, means for feeding the food material to be processed into said pockets at a first angular location, means for supplying a gaseous medium to said pockets at a second angular location, a single elongated treating chamber, and means at a third angular location diametrically opposite said second angular location for conveying food alternately discharged from said pockets at said third angular location to said single elongated chamber, said rotary valve means including first and second longitudinally spaced valve members, and said one pocket area being on said first valve member and said other pocket area being on said second valve member.

16. A method of processing food material comprising the steps of rotating a first rotative means for successively delivering during one revolution of said first rotative means individual quantities of food material during substantially equal periods of time to the inlet of an elongated treating chamber for processing therein, and rotating a second rotative means for successively delivering during one revolution of said second rotative means quantities of food material during substantially equal periods of time which last-mentioned time periods substantially equal said first-mentioned time periods to the inlet of said some elongated chamber, rotating both of said first and second rotative means at substantially the same rate of rotation, angularly offsetting said first and second rotative means so that said second rotative means delivers its successive quantities of food material to said elongated chamber during intervals of time when said first rotative means is not delivering its successive quantities to said elongated chamber, said substantially equal periods of time being determined by said rotation rate and being appreciably greater than the intervals of time therebetween.

17. A method of processing food material utilizing a single elongated treating chamber and two separate sources of food material to be processed comprising the steps of rotating first and second rotary valve means in an out-of-phase relationship at substantially the same speed, each of said rotary valve means including a plurality of pairs of diametrically located pockets with each pair of pockets having an interconnecting passage extending therebetween and said pairs of pockets being spaced at equal angles with respect to each other, introducing food material during a first interval of time into one pocket of said first rotary valve means from one of said sources when said one pocket is in a first angular position, introducing food material during a second interval of time into one pocket of said second rotary valve means from the other of said sources when said one pocket of said second rotary valve means is in a position angularly displaced from said one pocket of said first rotary valve means so that food material from the other of said sources is delivered to said elongated treating chamber when no material from said one source is being introduced and vice versa, discharging food material from said one pocket of said first rotary means during a third interval of time, and discharging food material from said one pocket of said second rotary valve means during a fourth interval of time, said first, second, third and fourth intervals of time being substantially equal to each other.

18. A method in accordance with claim 17 including the step of supplying a gaseous medium to said one pocket of said first rotary valve means during said third interval of time to effect said first-mentioned discharging step, and supplying a gaseous medium to said one pocket of said second rotary valve means during said fourth interval of time to effect said second-mentioned discharging step.

* * * * *